United States Patent
Chen et al.

(10) Patent No.: US 12,466,901 B2
(45) Date of Patent: Nov. 11, 2025

(54) POLYMERIZATION OF ETHYLENE IN SOLUTION PROCESSES USING A ZIEGLER-NATTA CATALYST AND A HYDROGENATION PROCATALYST

(71) Applicant: Dow Global Technologies LLC, Midland, MI (US)

(72) Inventors: Linfeng Chen, Missouri City, TX (US); David M. Pearson, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 907 days.

(21) Appl. No.: 17/630,802

(22) PCT Filed: Jul. 30, 2020

(86) PCT No.: PCT/US2020/044208
§ 371 (c)(1),
(2) Date: Jan. 27, 2022

(87) PCT Pub. No.: WO2021/022014
PCT Pub. Date: Feb. 4, 2021

(65) Prior Publication Data
US 2022/0306772 A1    Sep. 29, 2022

Related U.S. Application Data

(60) Provisional application No. 62/881,184, filed on Jul. 31, 2019.

(51) Int. Cl.
C08F 4/64        (2006.01)
C08F 4/619       (2006.01)
C08F 4/6192      (2006.01)
C08F 4/659       (2006.01)
C08F 10/02       (2006.01)

(52) U.S. Cl.
CPC ........ C08F 4/6192 (2013.01); C08F 4/61912 (2013.01); C08F 10/02 (2013.01)

(58) Field of Classification Search
CPC .............. C08F 4/64003; C08F 4/65904; C08F 4/65912
See application file for complete search history.

(56) References Cited

U.S. PATENT DOCUMENTS

| | | |
|---|---|---|
| 5,739,220 A | 4/1998 | Shamshoum et al. |
| 5,919,983 A | 7/1999 | Rosen et al. |
| 6,268,444 B1 | 7/2001 | Klosin et al. |
| 6,291,601 B1 | 9/2001 | Debras |
| 9,045,569 B2 | 6/2015 | Jensen et al. |
| 9,403,921 B2 | 8/2016 | Bhandarkar et al. |
| 9,556,288 B2 | 1/2017 | Bhandarkar et al. |
| 2006/0173123 A1 | 8/2006 | Yang et al. |
| 2006/0287449 A1 | 12/2006 | Miyamoto et al. |
| 2009/0299116 A1 | 12/2009 | Konze et al. |
| 2010/0036068 A1 | 2/2010 | Aso et al. |
| 2010/0036076 A1 | 2/2010 | Aso et al. |
| 2015/0166699 A1 | 6/2015 | Kao et al. |
| 2018/0094084 A1 | 4/2018 | You et al. |
| 2018/0265604 A1 | 9/2018 | Figuero et al. |

FOREIGN PATENT DOCUMENTS

| | | |
|---|---|---|
| EP | 0412750 A2 | 2/1991 |
| EP | 1605000 A1 | 12/2005 |
| EP | 2448977 B1 | 8/2015 |
| EP | 3255066 A1 | 12/2017 |
| WO | 2004099268 A1 | 11/2004 |
| WO | 2007136494 A3 | 11/2007 |
| WO | 2012097146 A1 | 7/2012 |
| WO | 2015200743 A1 | 12/2015 |
| WO | 2017034722 A1 | 3/2017 |
| WO | 2017058981 A1 | 4/2017 |
| WO | 2017173080 A1 | 10/2017 |
| WO | 2018183700 A1 | 10/2018 |

OTHER PUBLICATIONS

Chinese Office and Search Report dated Sep. 22, 2023, pertaining to CN Patent Application No. 202080054957.8, 17 pgs.
Chinese Office Action dated May 28, 2024, pertaining to CN Patent Application No. 202080054957.8, 8 pgs.
Singapore Written Opinion dated Jan. 12, 2024, pertaining to SG Patent Application No. 11202200681Q, 7 pgs.

(Continued)

*Primary Examiner* — Catherine S Branch
(74) *Attorney, Agent, or Firm* — Dinsmore & Shohl LLP

(57) ABSTRACT

Processes of polymerizing olefin monomers and catalyst systems. The catalyst systems include a non-hydrogen-generating post-metallocene procatalyst; a co-catalyst; and a hydrogenation procatalyst having the formula $Cp_2TiX_nTiCp_2$ or $Cp_2TiX_n$, in which each Cp is cyclopentadienyl substituted with at least one $(C_1\text{-}C_{10})$alkyl; each X is independently monoanionic or neutral, wherein each X is independently $(C_1\text{-}C_{40})$hydrocarbon, $(C_1\text{-}C_{40})$heterohydrocarbon, $(C_1\text{-}C_{40})$hydrocarbyl, $(C_1\text{-}C_{40})$heterohydrocarbyl, or a halogen atom; and n is 1 or 2.

14 Claims, No Drawings

(56) References Cited

OTHER PUBLICATIONS

Chinese Office Action dated Nov. 20, 2024, pertaining to CN Patent Application No. 202080054957.8, 16 pgs.
Japanese Office Action dated May 21, 2024, pertaining to JP Patent Application No. 2022-503800, 19 pgs.
International Search Report and Written Opinion dated Oct. 30, 2020, pertaining to Int'l Appl. No. PCT/US2020/044208 filed Jul. 30, 2020.
Williams et al. "The Construction of a Polyethylene Calibration Curve for Gel Permeation Chromatography Using Polystyrene Fractions" Polymer Letters, vol. 6, 621-624 (1968), 4 pgs.
International Preliminary Report on Patentability dated Feb. 1, 2022, pertaining to Int'l appl. No. PCT/US2020/044202 filed Jul. 30, 2020, 8 pages.
Communication pursuant to EPC Rules 161 (1) & 162 EPC dated Mar. 9, 2022, pertaining to EP patent application No. 20757151.5 filed Feb. 9, 2022, 3 pages.
Brazilian Office Action dated Apr. 8, 2025, pertaining to BR Patent Application No. BR 112022001384.1, 6 pgs.
Japanese Office Action dated Jan. 21, 2025, pertaining to JP Patent Application No. 2022-503800, 6 pgs.
Communication pursuant to Article 94(3) EPC dated Jun. 11, 2025, pertaining to EP Patent Application No. 20757731.3, 7 pgs.
Korean Office Action dated Jul. 17, 2025, pertaining to KR Patent Application No. 10-2022-7006103, 18 pgs.
Chinese Office Action dated Aug. 4, 2025, pertaining to CN Patent Application No. 202080054957.8, 10 pgs.

POLYMERIZATION OF ETHYLENE IN SOLUTION PROCESSES USING A ZIEGLER-NATTA CATALYST AND A HYDROGENATION PROCATALYST

CROSS-REFERENCE TO RELATED APPLICATIONS

This application is a National Stage Entry under 35 U.S.C. § 371 of International Patent Application No. PCT/US2020/044208, filed Jul. 30, 2020, which claims priority to U.S. Provisional Patent Application No. 62/881,184, filed on Jul. 31, 2019, the entire disclosures of both of which are hereby incorporated by reference.

TECHNICAL FIELD

Embodiments of the present disclosure generally relate to catalyst compositions for polymerizing ethylene or for copolymerizing ethylene and one or more α-olefins, and to polymerization processes that utilize such catalyst compositions.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers and propylene-based polymers are manufactured for a wide variety of articles. The polyethylene and polypropylene polymerization processes can be varied in a number of respects to produce a wide variety of resultant polyethylene resins having different physical properties that render the various resins suitable for use in different applications. The ethylene monomers and optionally one or more co-monomers are present in liquid diluents (such as solvents), such as an alkane or isoalkane, for example isobutene. Hydrogen may also be added to the reactor. The catalyst systems for producing ethylene-based polymers may typically comprise a chromium-based catalyst system, a Ziegler-Natta catalyst system, and/or a molecular (either metallocene or non-metallocene) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced.

Titanocene hydrogenation procatalysts have been used in (1) metallocene-catalyzed polymerization reactions, for removing $H_2$ generated by the metallocene polymerization catalysts; and (2) in one reactor of a linked reactor system, for removing $H_2$ carried over from a prior reactor. By removing the $H_2$ from a catalyst system, the $H_2$ cannot terminate the polymerization chain, thereby allowing an increase in molecular weight of the produced polymer. However, these applications of the titanocene catalysts for removing $H_2$ are limited to gas-phase and slurry-phase polymerization reactions in which reaction temperatures typically range from 60° C. to 120° C.

SUMMARY

There is an ongoing need to create catalyst systems or procatalysts that produce high molecular weight polymers at high polymerization temperatures (temperatures from 120° C. to 250° C.). Additionally, the catalyst system should have high efficiency, high reactivity, and ability to produce polymers with a high molecular weight (greater than 100,000 g/mol).

Embodiments of this disclosure include catalyst systems. The catalyst system includes a non-hydrogen-generating post-metallocene procatalyst; a co-catalyst; and a hydrogenation procatalyst having the formula $Cp_2TiX_2$ or $Cp_2TiX_nTiCp_2$. In the formulas, $Cp_2TiX_2$ and $Cp_2TiX_nTiCp_2$, each Cp is cyclopentadienyl optionally substituted with at least one $(C_1-C_{10})$alkyl; and each X is independently a halogen atom.

Embodiments of this disclosure include polymerization processes. The polymerization process for producing polyolefin polymers includes reacting $(C_2-C_{12})$α-olefins in solution in the presence of a catalyst system of this disclosure.

DETAILED DESCRIPTION

Embodiments of this disclosure include catalyst systems. In one or more embodiments, the catalyst system includes a non-hydrogen-generating post-metallocene procatalyst; a co-catalyst; and a hydrogenation procatalyst having the formula $Cp_2TiX_nTiCp_2$ or $Cp_2TiX_2$. In the formulas $Cp_2TiX_2$ and $Cp_2TiX_nTiCp_2$, each Cp is cyclopentadienyl substituted with at least one $(C_1-C_{10})$alkyl; each X is independently monoanionic or neutral, wherein each X is independently $(C_1-C_{40})$hydrocarbon, $(C_1-C_{40})$heterohydrocarbon, $(C_1-C_{40})$hydrocarbyl, $(C_1-C_{40})$heterohydrocarbyl, or a halogen atom; and n is 1 or 2.

In various embodiments, the catalyst system includes a non-hydrogen-generating post-metallocene procatalyst; and $Cp_2TiX_2$ treated with an aluminum alkyl species. In the formula, $Cp_2TiX_2$, each Cp is cyclopentadienyl optionally substituted with at least one $(C_1-C_{10})$alkyl; each X is independently monoanionic or neutral, wherein each X is independently $(C_1-C_{40})$hydrocarbon, $(C_1-C_{40})$heterohydrocarbon, $(C_1-C_{40})$hydrocarbyl, $(C_1-C_{40})$heterohydrocarbyl, or a halogen atom; and n is 1 or 2.

In embodiments of the catalyst system, the hydrogenation procatalyst has the formula $Cp_2TiX_2$. In formulas $Cp_2TiX_2$ and $Cp_2TiX_nTiCp_2$, each Cp is a cyclopentadienyl substituted with at least one $R^1$, wherein $R^1$ is $(C_1-C_{10})$alkyl; and each X is independently is independently $(C_1-C_{40})$hydrocarbon, $(C_1-C_{40})$heterohydrocarbon, a halogen atom, $(C_1-C_{40})$heterohydrocarbyl, or $(C_1-C_{40})$hydrocarbyl; and n is 1 or 2.

In one or more embodiments, in formulas $Cp_2TiX_2$ and $Cp_2TiX_nTiCp_2$, each Cp is substituted with at least one $R^1$ chosen from methyl, ethyl, propyl, 2-propyl, n-butyl, tert-butyl, iso-butyl, n-pentyl, n-hexyl, n-heptyl, n-octyl, 2-ethylhexyl, tert-octyl, n-nonyl, or n-decyl. In one or more embodiments, the hydrogenation procatalyst is chosen from ethylated-$Cp_2TiCl_2$, butylated-$Cp_2TiCl_2$, and ethylated-$Cp_2TiCl_2$.

In one or more embodiments, the hydrogenation procatalysts is chosen from bis(cyclopentadienyl)titanium chloride, bis(methylcyclopentadienyl)titanium chloride, bis(ethylcyclopentadienyl)titanium chloride, bis(butylcyclopentadienyl)titanium chloride.

In some embodiments, in formula $Cp_2TiX_2$, each X is a substituted benzyl or substituted heteroarylbenzyl. In other embodiments, X is selected from the group consisting of:

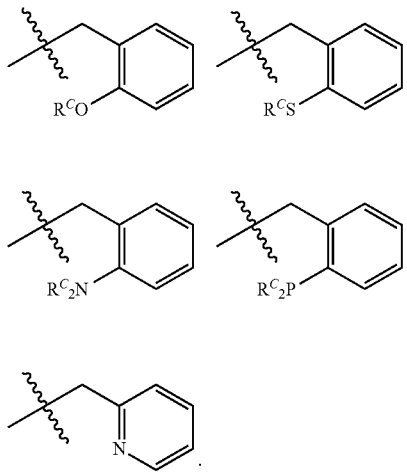

In one or more embodiments of the catalyst system, the hydrogenation procatalysts is unsupported.

In one of more embodiments, the aluminum alkyl species includes alkylaluminoxane, modified alkylaluminoxane, or an aluminum alkyl having the formula $AlR_3$ wherein each R is independently $(C_1-C_{40})$hydrocarbon $(C_1-C_{40})$heterohydrocarbon, $(C_1-C_{40})$hydrocarbyl, $(C_1-C_{40})$heterohydrocarbyl, or a halogen atom. In various embodiments, the aluminum species is the reaction product of $AlR_3$ and water, alcohol, silanol, or a Lewis basic, such as pyridine or alkylamine (mono-substituted, disubstituted, tri-substituted). A non-limiting list of the reaction product of $AlR_3$ and water, alcohol, silanol, or a Lewis basic include diisobutylaluminum oxide (DIBAO or DIBAL-O) or Isobutylaluminoxane (IBAO).

In some embodiments, the aluminum alkyl species is triisobutylaluminum (TiBAl) or aluminoxanes. The alkylaluminoxane may be a polymeric form of a $(C_1-C_{10})$alkylaluminoxane or a polymethylaluminoxane (PMAO). The PMAO may be a polymethylaluminoxane-Improved Performance (PMAO-IP), which is commercially available from AkzoNobel. The $(C_1-C_{10})$alkylaluminoxane may be methylaluminoxane (MAO), a modified methylaluminoxane (MMAO) such as modified methylaluminoxane, type 3A (MMAO-3A), type 7 (MMAO-7), or type 12 (MMAO-12), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, or 1-methylcyclopentylaluminoxane. The arylaluminoxane may be a $(C_6-C_{10})$arylaluminoxane, which may be phenylaluminoxane, 2,6-dimethylphenylaluminoxane, or naphthylaluminoxane.

Modified methylaluminoxanes are aluminoxanes structures possessing a mixture of methyl or longer alkyl substituents, which commonly thought to aid in the hydrocarbon solubility or the material and increase its stability toward gelation or other precipitation events that can occur with prolonged storage.

The non-hydrogen-generating post metallocene procatalyst of this disclosure includes non-metallocene procatalysts that do not generate $H_2$ or that generate less than or equal to 1 part per million (ppm) of $H_2$, less than or equal to 0.5 ppm of $H_2$, or less than or equal to 0.1 ppm of $H_2$ under solution polymerization conditions. The polymerization conditions may include polymerization temperatures of from 90° C. to 250° C. and pressures from 25 psig to 650 psig.

In one or more embodiments of the catalyst system, the non-hydrogen-generating post metallocene procatalyst is unsupported.

In one or more embodiments, the ratio of moles of aluminum in the aluminum alkyl species to moles of titanium in hydrogenation procatalyst is from 2:1 to 20:1. In some embodiments, the ratio of moles of aluminum to moles of titanium of 2.2:1 to 15:1 or 2.5: to 8:1.

In one or more embodiments, the non-hydrogen-generating post metallocene procatalyst includes a bis(phenylphenoxy) Group IV procatalyst or a constrained geometry Group IV procatalyst.

According to some embodiments, the bis(phenylphenoxy) metal-ligand complex has a structure according to formula (I):

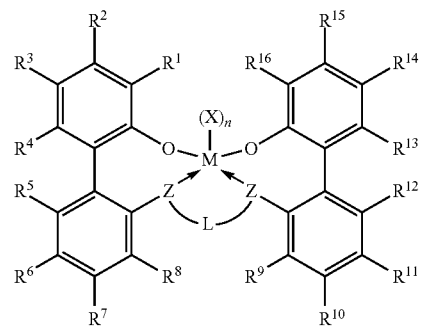

In formula (I), M is a metal chosen from titanium, zirconium, or hafnium, the metal being in a formal oxidation state of +2, +3, or +4. Subscript n of $(X)_n$ is 0, 1, or 2. When subscript n is 1, X is a monodentate ligand or a bidentate ligand, and when subscript n is 2, each X is chose from a monodentate ligand.

In formula (I), L is a diradical selected from the group consisting of $(C_1-C_{40})$hydrocarbylene, $(C_1-C_{40})$heterohydrocarbylene, —Si($R^C$)$_2$-, —Si($R^C$)$_2$OSi($R^C$)$_2$-, —Si($R^C$)$_2$C($R^C$)$_2$-, —Si($R^C$)$_2$Si($R^C$)$_2$-, —Si($R^C$)$_2$C($R^C$)$_2$Si($R^C$)$_2$-, —C($R^C$)$_2$Si($R^C$)$_2$C($R^C$)$_2$-, —N($R^N$)C($R^C$)$_2$-, —N($R^N$)N($R^N$)-, —C($R^C$)$_2$N($R^N$)C($R^C$)$_2$-, —Ge($R^C$)$_2$-, —P($R^P$)-, —N($R^N$)-, —O—, —S—, —S(O)—, —S(O)$_2$—, —N=C($R^C$)-, —C(O)O—, —OC(O)—, —C(O)N(R)—, and —N($R^C$)C(O)—.

In formula (I), each Z is independently chosen from —O—, —S—, —N($R^N$)-, or —P($R^P$)-. $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ are independently selected from the group consisting of —H, $(C_1-C_{40})$hydrocarbyl, $(C_1-C_{40})$heterohydrocarbyl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, —N═C(R$^C$)$_2$, R$^C$C(O)O—, R$^C$OC(O)—, R$^C$C(O)N(R)—, (R$^C$)$_2$NC(O)—, halogen, radicals having formula (XI), radicals having formula (XII), and radicals having formula (XIII):

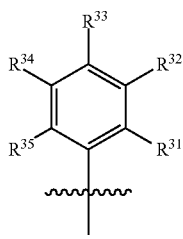

(XI)

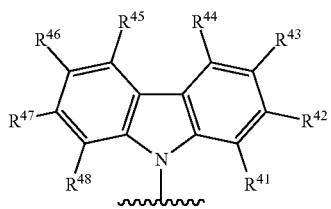

(XII)

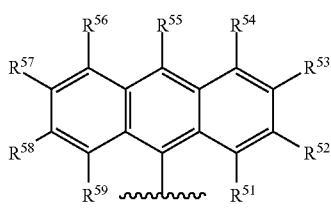

(XIII)

In formulas (XI), (XII), and (XIII), each of R$^{31}$-R$^{35}$, R$^{41}$-R$^{48}$, and R$^{51}$-R$^{59}$ is independently chosen from —H, (C$_1$-C$_{40}$)hydrocarbyl, (C$_1$-C$_{40}$)heterohydrocarbyl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C═N—, R$^C$C(O)O—, R$^C$OC(O)—, R$^C$C(O)N(R$^N$)-, (R$^C$)$_2$NC(O)—, or halogen, provided at least one of R$^1$ or R$^{16}$ is a radical having formula (XI), a radical having formula (XII), or a radical having formula (XIII).

The groups R$^1$ and R$^{16}$ in the metal-ligand complex of formula (I) are chosen independently of one another. For example, R$^1$ may be chosen from a radical having formula (II), (III), or (IV) and R$^{16}$ may be a (C$_1$-C$_{40}$)hydrocarbyl; or R$^1$ may be chosen from a radical having formula (II), (III), or (IV) and R$^{16}$ may be chosen from a radical having formula (II), (III), or (IV) the same as or different from that of R$^1$. Both R$^1$ and R$^{16}$ may be radicals of formula (II), for which the groups R$^{31\text{-}35}$ are the same or different in R$^1$ and R$^{16}$. In other examples, both R$^1$ and R$^{16}$ may be radicals of formula (III), for which the groups R$^{41\text{-}48}$ are the same or different in R$^1$ and R$^{16}$; or both R$^1$ and R$^{16}$ may be radicals of formula (IV), for which the groups R$^{51\text{-}59}$ are the same or different in R$^1$ and R$^{16}$.

In some embodiments, at least one of R$^1$ and R$^{16}$ is a radical having formula (II), where R$^{32}$ and R$^{34}$ are tert-butyl.

In some embodiments, when at least one of R$^1$ or R$^{16}$ is a radical having formula (III), one of or both of R$^{43}$ and R$^{46}$ is tert-butyl and each of R$^{41\text{-}42}$, R$^{44\text{-}45}$, and R$^{47\text{-}48}$ are —H. In other embodiments, one of or both of R$^{42}$ and R$^{47}$ is tert-butyl and R$^{41}$, R$^{43\text{-}46}$, and R$^{48}$ are —H. In some embodiments, both R$^{42}$ and R$^{47}$ are —H.

In some embodiments, R$^3$ and R$^{14}$ are tert-octyl, n-octyl, methyl, ethyl, propyl, 2-propyl, butyl, 1,1-dimethylethyl (or tert-butyl). In other embodiments, R$^6$ and R$^{11}$ are halogen. In some embodiments, R$^3$ and R$^{14}$ are methyl; and R$^6$ and R$^{11}$ are halogen.

In some embodiments of the metal-ligand complex of formula (I), when R$^{5\text{-}7}$ are fluorine, not more than one of R$^{10\text{-}12}$ is fluorine. In other embodiments, when R$^{10\text{-}12}$ are fluorine, not more than one of R$^{5\text{-}7}$ is fluorine. In other embodiments, fewer than four of R$^{5\text{-}7}$ and R$^{10\text{-}12}$ are fluorine. In one or more embodiments, R$^7$, R$^8$, R$^9$, and R$^{10}$ are —H. In some embodiments, R$^7$ and R$^{10}$ are halogen. In some embodiments, two of R$^{5\text{-}7}$ are fluorine and two of R$^{10\text{-}12}$ are fluorine.

In one or more embodiments, in formula (I), L is chosen from —CH$_2$CH$_2$CH$_2$—, —(CH$_2$)$_x$GeR$^G$$_2$(CH$_2$)$_x$—, or —(CH$_2$)$_x$SiR$_2$(CH$_2$)$_x$—, where each x is independently 1, 2, or 3.

The M in the metal-ligand complex of formula (I) may be a transition metal such as titanium (Ti), zirconium (Zr), or hafnium (Hf), and the transition metal may have a formal oxidation state of +2, +3, or +4. The subscript n of (X)$_n$, referring to a number of ligands X bonded to or associated with the metal M, is 1, 2, or 3.

In one or more embodiments, in formula (I), each X can be a monodentate ligand that, independently from any other ligands X, is a halogen, unsubstituted (C$_1$-C$_{20}$)hydrocarbyl, unsubstituted (C$_1$-C$_{20}$)hydrocarbylC(O)O—, or R$^K$R$^L$N—, wherein each of R$^K$ and R$^L$ independently is an unsubstituted (C$_1$-C$_{20}$)hydrocarbyl.

In some embodiments, in formula (I), each X is selected from methyl; ethyl; 1-propyl; 2-propyl; 1-butyl; 2,2-dimethylpropyl; trimethylsilylmethyl; phenyl; benzyl; or chloro. In some embodiments, each X is the same. In other embodiments, at least two X are different from each other. In the embodiments in which at least two X are different from at least one X, X is a different one of methyl; ethyl; 1-propyl; 2-propyl; 1-butyl; 2,2,-dimethylpropyl; trimethylsilylmethyl; phenyl; benzyl; and chloro. In further embodiments, the bidentate ligand is 2,2-dimethyl-2-silapropane-1,3-diyl or 1,3-butadiene.

In illustrative embodiments, the catalyst systems may include a metal-ligand complex according to formula (I) having the structure of any of the PCAT-1, PCAT-2, PCAT-3:

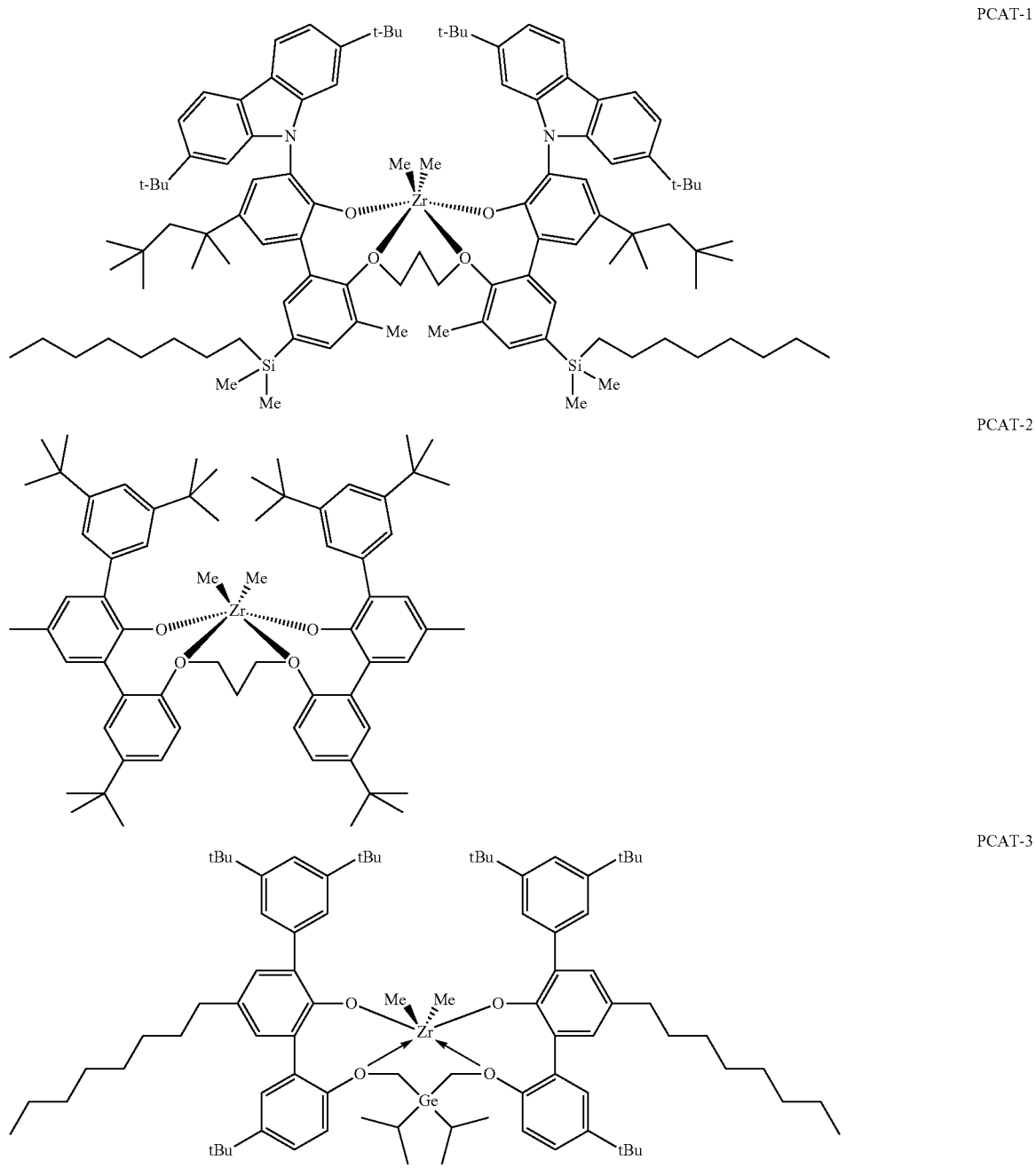

(2',2''-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol)dimethyl-hafnium (Procatalyst 1A);

(2',2''-(propane-1,3-diylbis(oxy))bis(3-(3,6-di-tert-butyl-9H-carbazol-9-yl)-3'-chloro-5-(2,4,4-trimethylpentan-2-yl)biphenyl-2-ol)dimethyl-hafnium (Procatalyst 2A);

(2',2''-(propane-1,3-diylbis(oxy))bis(3'-chloro-3-(3,6-di-tert-butyl-9H-carbazol-9-yl)-5'-fluoro-5-(2,4,4-trimethylpentan-2-yl)biphenyl-2-ol)dimethyl-hafnium (Procatalyst 3A);

(2',2''-(propane-1,3-diylbis(oxy))bis(3-(3,6-di-tert-butyl-9H-carbazol-9-yl)-3'-methyl-5-(2,4,4-trimethylpentan-2-yl)biphenyl-2-ol)dimethyl-hafnium (Procatalyst 4A);

(2',2''-(propane-1,3-diylbis(oxy))bis(5'-cyano-3-(3,6-di-tert-butyl-9H-carbazol-9-yl)-3'-methyl-5-(2,4,4-trimethylpentan-2-yl)biphenyl-2-ol)dimethyl-hafnium (Procatalyst 5A);

(2',2''-(propane-1,3-diylbis(oxy))bis(5'-dimethylamino-3-(3,6-di-tert-butyl-9H-carbazol-9-yl)-3'-methyl-5-(2,4,4-trimethylpentan-2-yl)biphenyl-2-ol)dimethyl-hafnium (Procatalyst 6A);

(2',2''-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol)dimethyl-hafnium (Procatalyst 7A);

(2',2''-(propane-1,3-diylbis(oxy))bis(5'-chloro-3-(3,6-di-tert-butyl-9H-carbazol-9-yl)-3'-ethyl-5-(2,4,4-trimethylpentan-2-yl)biphenyl-2-ol)dimethyl-hafnium (Procatalyst 8A);

(2',2'''-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol)dimethyl-hafnium (Procatalyst 9A);

(2',2'''-(propane-1,3-diylbis(oxy))bis(3-(3,6-di-tert-butyl-9H-carbazol-9-yl)-5'-fluoro-3'-methyl-5-(2,4,4-trimethylpentan-2-yl)biphenyl-2-ol)dimethyl-hafnium (Procatalyst 10A);

(2',2'''-(propane-1,3-diylbis(oxy))bis(3-(9H-carbazol-9-yl)-5'-chloro-3'-methyl-5-(2,4,4-trimethylpentan-2-yl)biphenyl-2-ol)dimethyl-hafnium (Procatalyst 11A);

(2',2'''-(propane-1,3-diylbis(oxy))bis(3-(3,6-di-tert-butyl-9H-carbazol-9-yl)-3'-methyl-5'-trifluoromethyl-5-(2,4,4-trimethylpentan-2-yl)biphenyl-2-ol)dimethyl-hafnium (Procatalyst 12A);

(2',2'''-(2,2-dimethyl-2-silapropane-1,3-diylbis(oxy))bis(3',5'-dichloro-3-(3,6-di-tert-butyl-9H-carbazol-9-yl)-5-(2,4,4-trimethylpentan-2-yl)biphenyl-2-ol)dimethyl-hafnium (Procatalyst 13A);

(2',2'''-(2,2-dimethyl-2-silapropane-1-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium (Procatalyst 14A);

(2',2'''-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol)dimethyl-hafnium (Procatalyst 15A);

(2',2'''-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-ol)-(3'',5''-dichloro-3-(3,6-di-tert-butyl-9H-carbazol-9-yl)-5-(2,4,4-trimethylpentan-2-yl)biphenyl-2-ol)dimethyl-hafnium (Procatalyst 16A);

(2',2'''-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol)dimethyl-hafnium (Procatalyst 17A);

(2',2'''-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium (Procatalyst 18A);

(2',2'''-(ethane-1,2-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium (Procatalyst 19A);

(2',2'''-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-zirconium (Procatalyst 20A);

(2',2'''-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol)dimethyl-titanium (Procatalyst 24); and (2',2'''-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-titanium (Procatalyst 21A).

According to some embodiments, the non-hydrogen-generating post metallocene procatalyst is a metal-ligand complex according to formula (II):

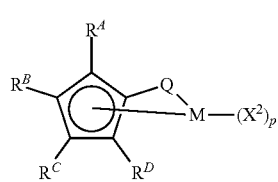

(II)

In formula (II), M is a metal selected from metals of any of Groups 3 to 13 of the Periodic Table of the Elements, lanthanides, and actinides, the metal being in a formal oxidation state of +2, +3 or +4.

In formula (II), each $R^A$, $R^B$, $R^C$ and $R^D$ is —H, ($C_1$-$C_{40}$) hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, $R^C$S(O)$_2$, —N=C($R^C$)$_2$, $R^C$C(O)O—, $R^C$OC(O)—, $R^C$C(O)N(R)—, ($R^C$)$_2$NC(O)—, or halogen. Optionally, any two of $R^A$, $R^B$, $R^C$ and $R^D$ may be connected to form a non-aromatic ring or an aromatic ring. Q is boron, nitrogen, phosphorus, sulfur, oxygen, carbon, silicon, or germanium.

In formula (II), each $X^2$ is independently a monodentate ligand, wherein the monodentate ligand is monoanionic or dianionic, a halogen, unsubstituted ($C_1$-$C_{20}$)hydrocarbyl, unsubstituted ($C_1$-$C_{20}$)hydrocarbylC(O)O—, or $R^K R^L N$—, wherein each of $R^K$ and $R^L$ independently is an unsubstituted ($C_1$-$C_{20}$)hydrocarbyl. Subscript p of $(X^2)_p$ is 1, 2, or 3. In some embodiments, (1) when $X^2$ is an anionic ligand, p is two less than the formal oxidation state of M; or (2) when $X^2$ is a dianionic ligand group, p is 1.

In illustrative embodiments, the catalyst systems may include a metal-ligand complex according to formula (II) having the structure of PCAT-4:

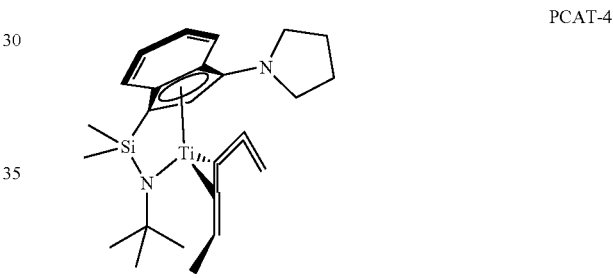

PCAT-4

Cocatalyst Component

The catalyst system comprising a metal-ligand complex of formula (I) or formula (II) may be rendered catalytically active by any technique known in the art for activating metal-based catalysts of olefin polymerization reactions. For example, the procatalyst according to a metal-ligand complex of formula (I) or formula (II) may be rendered catalytically active by contacting the complex to, or combining the complex with, an activating co-catalyst. Additionally, the metal-ligand complex according to formula (I) or formula (II) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing ($C_1$-$C_{20}$)hydrocarbyl substituents as described herein. In some embodiments, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activating co-catalysts include mixtures comprising a combination of a tri(($C_1$-$C_4$)alkyl)aluminum and a halogenated tri(($C_6$-$C_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane):(alumoxane) [e.g., (Group 4 metal-ligand complex):(tris(pentafluoro-phenylborane):(alumoxane)] are from 1:1:1 to 1:10:30, in other embodiments, from 1:1:1.5 to 1:5:10.

The catalyst system that includes the metal-ligand complex of formula (I) or formula (II) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of the total number of moles of one or more metal-ligand complexes of formulas (I) or (II) to the total number of moles of one or more of the activating co-catalysts is from 1:10,000 to 100:1. In some embodiments, the ratio is from 1:5000, or from 1:1000, to 10:1 or to 1:1. When an alumoxane alone is used as the activating co-catalyst, preferably the number of moles of the alumoxane that are employed is at least 100 times the number of moles of the metal-ligand complex of formula (I) or formula (II). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) or formula (II) is from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I) or formula (II).

Embodiments of this disclosure include polymerization processes. The polymerization process for producing polyolefin polymers includes reacting ethylene and optionally one or more α-olefin monomers in solution in the presence of a catalyst system of this disclosure, in which the catalyst system includes a non-hydrogen-generating post-metallocene procatalyst and a hydrogenation procatalyst as previously disclosed.

In one or more embodiments of the polymerization process, the one or more α-olefin may be ($C_2$-$C_{12}$)α-olefins. In some embodiments, there is only a single type of olefin, ethylene, in the polymerization process. In some embodiments, the polymerization process includes a co-monomer selected from ($C_3$-$C_{12}$)α-olefin. In various embodiments, the ($C_2$-$C_{12}$)α-olefin monomers include, but are not limited to, ethylene, propylene, 1-butene, 1-pentene, 1-hexene, 1-heptene, 1-octene, 1-nonene, 1-decene, 4-methyl-1-pentene, and combinations thereof. For example, the one or more α-olefin co-monomers may be selected from the group consisting of propylene, 1-butene, 1-hexene, and 1-octene; or from the group consisting of 1-hexene and 1-octene.

In one or more embodiments of the polymerization process, ($C_2$-$C_{12}$)α-olefins are reacted in solution in a reactor at a reaction temperature from 150° C. to 350° C.

Embodiments of the polymerization processes include, but are not limited to, solution polymerization processes using one or more conventional reactors such as loop reactors, isothermal reactors, stirred tank reactors, batch reactors in parallel, series, or any combinations thereof, for example. In one embodiment, the polymerization process may include solution polymerization in a dual reactor system, for example a dual loop reactor system, wherein ethylene and, optionally, one or more α-olefins are polymerized in the presence of the catalyst system, as described herein, and optionally one or more cocatalysts. The catalyst system, as described herein, may be present in the first reactor or in the second reactor, optionally in combination with one or more other catalysts. In one embodiment, an ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the polymerization process may include a solution polymerization in a single-reactor system, for example a single loop reactor system or a single stirred tank reactor system, in which ethylene is polymerized, optionally in combination with one or more α-olefin co-monomers, in the presence of the catalyst system as described within this disclosure, optionally one or more cocatalysts, as described in the preceding paragraphs and optionally in combination with one or more other catalysts.

Test Methods

Gel Permeation Chromatography (GPC) Method

For gel permeation chromatography (GPC), the chromatographic system includes a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. The autosampler oven compartment is set at 160° C. and the column compartment is set at 150° C. The columns are 4 Agilent "Mixed A" 30 cm 20-micron linear mixed-bed columns. The chromatographic solvent is 1,2,4 trichlorobenzene and contains 200 ppm of butylated hydroxytoluene (BHT). The solvent source is sparged with nitrogen. The injection volume is 200 microliters and the flow rate is 1.0 milliliters/minute.

The GPC column set is calibrated with 21 narrow molecular weight distribution polystyrene standards with molecular weights ranging from 580 g/mol to 8,400,000 g/mol that are arranged in 6 "cocktail" mixtures with at least a decade of separation between individual molecular weights. The standards are purchased from Agilent Technologies. The polystyrene standards are prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards are dissolved at 80 degrees Celsius with gentle agitation for 30 minutes. The polystyrene standard peak molecular weights are converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQ1)}$$

where M is the molecular weight, A has a value of 0.4315 and B is equal to 1.0.

A fifth-order polynomial is used to fit the respective polyethylene-equivalent calibration points. A small adjustment to A (from approximately 0.405 to 0.440) may be made to correct for column resolution and band-broadening effects such that NIST standard NBS 1475 is obtained at 52,000 Mw.

The total plate count of the GPC column set may be performed with decane (prepared at 0.04 g in 50 milliliters of TCB.) The plate count (Equation 2) and symmetry (Equation 3) may be measured on a 200 microliter injection according to the following equations:

$$\text{Plate Count} = 5.54 * \left(\frac{RV_{PeakMax}}{\text{Peak Width at } \frac{1}{2} \text{ height}}\right)^2 \quad \text{(EQ 2)}$$

where RV is the retention volume in milliliters, the peak width is in milliliters, the peak max is the maximum height of the peak, and 1/2 height is 1/2 height of the peak maximum.

$$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})} \quad \text{(EQ 3)}$$

In EQ 3, RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples may be prepared in a semi-automatic manner with the PolymerChar "Instrument Control" Software, wherein the samples are weight-targeted at 2 mg/ml, and the solvent (contained 200 ppm BHT) is added to a pre nitrogen-sparged septa-capped vial, via the PolymerChar high temperature autosampler. The samples are dissolved for 2 hours at 160° Celsius under "low speed" shaking.

The calculations of Mn, Mw, and Mz are based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i).

$$Mn = \frac{\sum^i IR_i}{\sum^i (IR_i / M_{polyethylene_i})} \quad \text{(EQ 4)}$$

$$Mw = \frac{\sum^i (IR_i * M_{polyethylene_i})}{\sum^i IR_i} \quad \text{(EQ 5)}$$

$$Mz = \frac{\sum^i (IR_i * M_{polyethylene_i}^2)}{\sum^i (IR_i * M_{polyethylene_i})} \quad \text{(EQ 6)}$$

To monitor the deviations over time, a flowrate marker (decane) is introduced into each sample via a micropump controlled with the PolymerChar GPC-IR system. This flowrate marker (FM) is used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are assumed to be related to a linear-shift in flowrate (Flowrate(effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7 (EQ 7). Processing of the flow marker peak is done via the PolymerChar GPCOne™ Software. Acceptable flowrate correction is such that the effective flowrate should be within +/−2% of the nominal flowrate.

Flowrate(effective)=Flowrate(nominal)*(RV(FM Calibrated)/RV(FM Sample)) (EQ7)

Short Chain Branching Measurement.

Short chain branching per 1000 total C (SCDB/1000TC) is measured according to method described in the "Molecular Weighted Comonomer Distribution Index (MWCDI)" section of WO2015200743A1.

Catalyst Efficiency

Calculate catalyst efficiency based on the amount of ethylene consumed during polymerization per gram of metal in the polymerization procatalyst (g ethylene/g Metal). The grams of Metal refers to the grams of Metal contributed by the metal in the polymerization procatalyst and does not include Ti in the alkylated titanocene hydrogenation procatalyst.

Solution Batch Reactor Copolymerization Test Method

The batch reactor is charged with specified amounts of 1-octene and Isopar E with the total amount of 1-octene and Isopar E being 1580 g. The reactor contents are heated to the desired polymerization temperature, then the contents are saturated with ethylene in presence of a specified amount of molecular hydrogen ($H_2$). A solution of non-hydrogen generating post-metallocene procatalyst and co-catalyst are mixed at molar ratio of co-catalyst to procatalyst of 1.2:1, followed by addition of MMAO-3A to the mixture at molar ratio of MMAO-3A to procatalyst 50/1. Alkylated titanocene hydrogenation procatalyst ($Cp_2TiCl_2$-TiBAl or $Cp_2TiCl_2$-MMAO-3A) is added to the mixture. The content is immediately injected into the reactor. The amount of the procatalysts is adjusted for maintaining ethylene consumption during polymerization within proximately 10-30 g in order to avoid a large temperature spike in the reactor at the beginning of the polymerization. The pressure was maintained in the reactor at 3100 kilopascals (kPa; equal to 450 pounds per square inch (psi)) with ethylene flow to compensate for pressure drop due to ethylene consumption during polymerization thereof. After 10 minutes reaction time, the bottom valve is opened and the reactor contents are transferred into a glass kettle. The contents of kettle are poured onto a Mylar lined tray and allowed to cool completely and dried at standard temperature and pressure. The dried contents are further dried under reduced pressure to obtain a product poly(ethylene-co-1-octene) copolymer.
Catalyst Efficiency.

Catalyst efficiency is calculated based on the amount of ethylene consumed during polymerization per gram of metal in the polymerization procatalyst (g ethylene/g Metal). The grams of Metal refers to the grams of Metal contributed by the metal in the polymerization procatalyst and does not include Ti in the alkylated titanocene hydrogenation procatalyst.

EXAMPLES

The following examples are provided to illustrate embodiments described in this disclosure and are not intended to limit the scope of this disclosure or its appended claims.

Preparation of the Non-Hydrogen-Generating Post-Metallocene Pro catalyst

PCAT-1 was synthesized generally according to example I4 in WO2017058981 by replacing $HfCl_4$ in the example I4 with an equimolar amount of $ZrCl_4$.

PCAT-2. PCAT-2 was synthesized according to Example A11 in WO2007136494.

PCAT-3. PCAT-3 was synthesized according to Example 23 in WO2018183700A1.

PCAT-4. PCAT-4 was synthesized according to Example 7 in U.S. Pat. No. 6,268,444B1

| Procatalyst # | Structure |
|---|---|
| PCAT-1 | |
| PCAT-2 | |

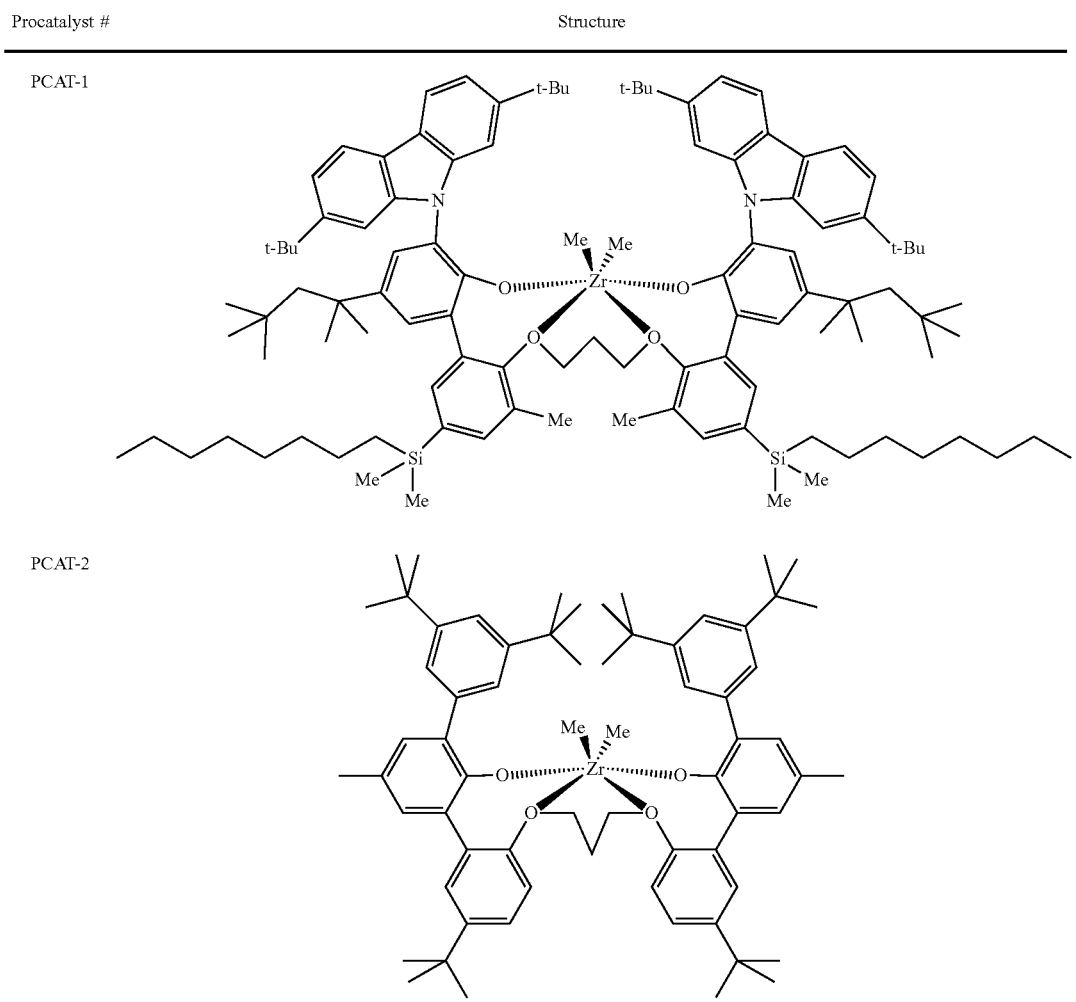

-continued

| Procatalyst # | Structure |
|---|---|
| PCAT-3 | (structure shown) |
| PCAT-4 | (structure shown) |

Co-Catalyst (Co-Cat. 1). Co-Cat. 1 is a methyldi((C14-C18)alkyl)ammonium salt of tetrakis(pentafluorophenyl)borate, which may be prepared by reaction of a long chain trialkylamine (Armeen™ M2HT, available from Akzo Nobel, Inc.), HCl and Li[B($C_6F_5$)$_4$]. Such a preparation is disclosed in U.S. Pat. No. 5,919,983, Example 2. Co-Cat. 1 is purchased from Boulder Scientific.

Preparation of Modified Hydrogenating Catalysts

Alkylated Titanocene Hydrogenation Procatalyst $Cp_2TiCl_2$-Al($^i$Bu)$_3$. A 4 ounce bottle was charged with 0.544 g of $Cp_2TiCl_2$, 4 mL of Isopar E solvent, and a stir bar to form a mixture. To this mixture, 38.0 mL of 1.0 M tri-isobutylaluminum (Al($^i$Bu)$_3$) solution in hexanes was slowly add over 10 minutes with stirring. The solid $Cp_2TiCl_2$ became soluble and formed a blue solution. The molar ratio in the solution of Al from the Al($^i$Bu)$_3$ to Ti from the $Cp_2TiCl_2$ was 17.4.

Alkylated Titanocene Hydrogenation procatalyst $Cp_2TiCl_2$-MMAO-3A. Add 50.0 mmoles MMAO-3A of a 7 wt. % aluminum solution in heptane (27 mL) to 1.0 mmole of $Cp_2TiCl_2$ with agitation. The solid $Cp_2TiCl_2$ became soluble and formed a blue solution. The molar ratio in the solution of Al from the MMAO-3A to Ti from the $Cp_2TiCl_2$ was 50.

MMAO-3A. is modified methylaluminoxane, type 3A (MMAO-3A) having an approximate molecular formula [($CH_3$)$_{0.7}$(iso-$C_4H_9$)$_{0.3}$AlO; CAS REGISTRY No. 146905-79-5] and is obtained as a solution in heptane from Akzo Nobel N.V.

Polymerizations of ethylene and α-olefins, specifically of ethylene and 1-octene, were conducted in the presence of different amounts of $H_2$ for establishing a relationship between (1) polymer weight average molecular weight (Mw) and $H_2$ amount; (2) change in molecular weight; and (3) level of short chain branching, and the characteristics of the resulting polymeric and catalyst systems were recorded in Tables 1-8.

The solution batch reactor polymerization experiments, for which data is provided in Tables 1-8, were conducted using the solution batch reactor method previously described.

TABLE 1

Polymerization PCAT-1 with and without hydrogenation procatalyst $Cp_2TiCl_2$—Al($^i$Bu)$_3$

| Example # | PCAT-1 Loading (μmol of metal) | Polymn Temp (° C.) | 1-Octene (g) | $H_2$ (mmol) | $Cp_2TiCl_2$—Al($^i$Bu)$_3$ amt (μmol of Ti) | Eff ($10^6$ g/gM) | Mw (g/mol × $10^3$) | SCB/1000 TC | ΔMw (%) |
|---|---|---|---|---|---|---|---|---|---|
| CE1 | 0.56 | 190 | 100 | 160 | 0 | 0.30 | 41 | 0.3 | 0 |
| CE2 | 0.50 | 190 | 100 | 0 | 8 | 0.56 | 114 | 1.1 | — |
| CE3 | 0.25 | 190 | 100 | 0 | 0 | 0.57 | 116 | 1.2 | — |
| IE1 | 0.50 | 190 | 100 | 160 | 2 | 0.79 | 44 | 1.4 | 8 |
| IE2 | 0.50 | 190 | 100 | 160 | 8 | 0.65 | 69 | 0.9 | 71 |

The Δ(Mw) (%) was calculated as the percentage of increase in polymer Mw over the Mw of the polymer obtained under the same polymerization condition without using the hydrogenation procatalyst. In IE1 and IE2, each Δ(Mw) (%) was calculated based on the molecular weight of the polymer produced in CE1.

In Comparative Example 1 (CE1), Innovative Example 1 (IE1), and Innovative Example 2 (IE2), the polymerization conditions included hydrogen. The catalyst system of IE1 and IE2 included PCAT-1 and the hydrogenation procatalyst, $Cp_2TiCl_2$-Al($^i$Bu)$_3$. The catalyst system of CE1 lacked the hydrogenation procatalyst. The polymers produced in IE1 and IE2 had a greater molecular weight than the polymer produced in CE1. Additionally, the polymers produced in IE1 and IE2 had a similar amount of short chain branching per 1000 total carbon atoms (SCB/1000 TC) as the polymer in CE1.

The polymerization reaction conditions for Comparative Example 2 (CE2) and Comparative Example 3 (CE3) lacked hydrogen. In the absence of $H_2$, the catalyst system that included the hydrogenation procatalyst, $Cp_2TiCl_2$-Al($^i$Bu)$_3$, produced a polymer with a molecular weight less than the molecular weight of the polymer produced by the catalyst system of CE3, which lacked the hydrogenation procatalyst. The lower molecular weight of the polymer in CE2 indicated that the post-metallocene procatalyst PCAT-1 did not generate $H_2$ or did not generate an amount of $H_2$ that significantly reduced molecular weight of the polymer. Instead, it is believed that the molecular weight of the polymer in CE2 was less than the molecular weight of the polymer in CE3 due to the addition of the alkylated titanocene hydrogenation procatalyst $Cp_2TiCl_2$-Al($^i$Bu)$_3$. Without intent to be bound by theory, the participation of alkyl Al species in the hydrogenation procatalyst in polymer caused chain transfer reaction, which caused the polymer in CE2 to have a smaller molecular weight.

TABLE 2

Polymerization PCAT-1 with and without hydrogenation procatalyst $Cp_2TiCl_2$-MMAO-3A

| Example # | PCAT-1 Loading (μmol of metal) | Temp (° C.) | 1-Octene (g) | $H_2$ (mmol) | $Cp_2TiCl_2$-MMAO-3A | Eff ($10^6$ g/gM) | Mw (×$10^3$) | ΔMw (%) |
|---|---|---|---|---|---|---|---|---|
| CE4 | 0.07 | 190 | 100 | 160 | 0 | 3.42 | 44 | 0 |
| IE3 | 0.31 | 190 | 100 | 160 | 0.5 | 0.57 | 52 | 18 |
| IE4 | 0.37 | 190 | 100 | 160 | 2 | 0.46 | 56 | 27 |
| IE5 | 0.52 | 190 | 100 | 160 | 4 | 0.44 | 64 | 45 |
| IE6 | 0.62 | 190 | 100 | 160 | 8 | 0.38 | 84 | 91 |

For each of the examples in Table 2, the hydrogenation procatalyst used in the polymerization reactions was $Cp_2TiCl_2$-MMAO-3A. In each of the examples in Table 2, the temperature, ethylene pressure, and the octene starting amount were identical, and the ratio of moles of PCAT-1 to moles of $Cp_2TiCl_2$ were varied. The molecular weight of the polymers produced in the examples of Table 2 increased with respect to the amount of hydrogenation procatalyst present in the system.

TABLE 3

Polymerization PCAT-2 with and without hydrogenation procatalyst $Cp_2TiCl_2$—Al($^i$Bu)$_3$ and $Cp_2TiCl_2$-MMAO-3A

| Ex # | PCAT-2 Loading (μmol) | Temp (° C.) | Octene (g) | $H_2$ (mmol) | $Cp_2TiCl_2$—Al($^i$Bu)$_3$ | $Cp_2TiCl_2$-MMAO-3A | Eff ($10^6$ g/gM) | Mw (×$10^3$) | SCB/1000TC | Δ(Mw) (%) |
|---|---|---|---|---|---|---|---|---|---|---|
| CE5 | 1.50 | 190 | 100 | 160 | 0 | — | 0.41 | 45 | 16.3 | 0 |
| CE6 | 1.00 | 190 | 100 | 0 | 8 | — | 0.18 | 201 | 14.3 | |
| CE7 | 0.70 | 190 | 100 | 0 | 0 | — | 0.44 | 240 | 12.7 | |
| IE7 | 1.00 | 190 | 100 | 160 | 2 | — | 0.38 | 73 | 13.4 | 65 |
| IE8 | 1.00 | 190 | 100 | 160 | 8 | — | 0.22 | 161 | 12.7 | 261 |
| CE8 | 1.1 | 190 | 100 | 160 | — | 0 | 0.14 | 49 | | 0 |
| IE9 | 1 | 190 | 100 | 160 | — | 2 | 0.18 | 121 | | 146 |
| IE10 | 1 | 190 | 100 | 160 | — | 8 | 0.14 | 270 | | 449 |

When hydrogen gas was in the reactor system, the molecular weights of the polymers produced by catalyst systems having PCAT-2 and the hydrogenating catalyst, $Cp_2TiCl_2$-Al($^i$Bu)$_3$ were greater than to the molecular weights of the polymers produced by the comparative catalyst system of CE5.

Compared to the catalyst systems containing PCAT-1 and $Cp_2TiCl_2$-Al($^iBu$)$_3$, the catalyst systems containing PCAT-2 and $Cp_2TiCl_2$-Al($^iBu$)$_3$ produced polymers with greater amounts of short chain branching (comonomer incorporation).

TABLE 4

Polymerization PCAT-3 with and without hydrogenation procatalyst $Cp_2TiCl_2$—Al($^iBu$)$_3$

| Example # | PCAT_3 Loading (μmol) | Polymn Temp (° C.) | 1-Octene (g) | H$_2$ (mmol) | $Cp_2TiCl_2$—Al($^iBu$)$_3$ | Eff (10$^6$ g/gM) | Mw (×10$^3$) | SCB/1000TC | Δ(Mw) (%) |
|---|---|---|---|---|---|---|---|---|---|
| CE9 | 1.20 | 190 | 100 | 160 | 0 | 0.22 | 38 | 17.7 | 0 |
| IE11 | 1.20 | 190 | 100 | 160 | 2 | 0.11 | 146 | 15.3 | 282 |
| IE12 | 2.00 | 190 | 100 | 160 | 8 | 0.06 | 242 | 11.9 | 531 |
| CE10 | 1.75 | 190 | 100 | 0 | 8 | 0.15 | 462 | 15.1 | |
| CE11 | 1.20 | 190 | 100 | 0 | 0 | 0.22 | 480 | 14.6 | |

Examples CE9 (no hydrogenating catalyst) and IE11 and IE12 (included hydrogenating catalyst and non-hydrogen-generating post metallocene procatalyst), all were performed in the presence of hydrogen. The catalyst systems of IE11 and IE12 produced polymers with a greater molecular weight than that of the polymers produced in CE9.

In Examples CE10 and CE11, the polymerization reactions were performed without added hydrogen. Example CE10, which included hydrogenation procatalyst and the post-metallocene procatalyst, produced a polymer having a molecular weight that was less than the polymer produced by the catalyst system lacking the hydrogenation procatalyst, CE11. This indicates that the post-metallocene procatalyst PCAT-3 does not generate or does not generate a significant amount of H$_2$ to reduce molecular weight of the polymer.

To obtain the results in Table 5, the polymerization temperatures and the comonomer amount were varied, and polymerization reactions were performed without added hydrogen.

TABLE 5

Polymerization PCAT-3 with and without hydrogenation procatalyst $Cp_2TiCl_2$—Al($^iBu$)$_3$ without added of H$_2$

| Example # | PCAT-3 Loading (μmol) | Polymn Temp (° C.) | 1-Octene (g) | H$_2$ (mmol) | $Cp_2TiCl_2$—Al($^iBu$)$_3$ | Eff (10$^6$ g/gM) | Mw (×10$^3$) | SCB/1000TC |
|---|---|---|---|---|---|---|---|---|
| CE12 | 0.50 | 170 | 100 | 0 | 0 | 0.33 | 916 | 15.9 |
| CE13 | 2.50 | 170 | 100 | 0 | 4 | 0.08 | 655 | 15.8 |
| CE14 | 4.00 | 170 | 100 | 0 | 8 | 0.05 | 601 | 15.8 |
| CE15 | 0.63 | 170 | 250 | 0 | 0 | 0.33 | 812 | 29.8 |
| CE16 | 2.50 | 170 | 250 | 0 | 4 | 0.09 | 667 | 29.2 |
| CE17 | 4.00 | 170 | 250 | 0 | 8 | 0.07 | 630 | 29.1 |

When the polymerization reactions were performed without added hydrogen, the molecular weights of the polymers produced by catalyst systems that included the hydrogenation procatalyst and the post-metallocene procatalyst (PCAT-3) were less than those of the polymers produced by the catalyst system lacking the hydrogenation procatalyst, regardless of the temperature and comonomer amount. This observation further confirms that the post-metallocene procatalyst PCAT-3 does not generate an amount of H$_2$ sufficient to significantly reduce the molecular weight of the polymer.

TABLE 6

Polymerization PCAT-3 with and without hydrogenation procatalyst $CP_2TiCl_2$-MMAO-3A

| Example # | PCAT-3 Loading (μmol) | Polymn Temp (° C.) | 1-Octene (g) | H$_2$ (mmol) | $Cp_2TiCl_2$-MMAO-3A | Eff (10$^6$ g/gM) | Mw (×10$^3$) | Δ(Mw) (%) |
|---|---|---|---|---|---|---|---|---|
| CE18 | 0.37 | 190 | 100 | 160 | 0 | 0.50 | 42 | 0 |
| IE13 | 0.94 | 190 | 100 | 160 | 0.5 | 0.14 | 170 | 306 |
| IE14 | 2.1 | 190 | 100 | 160 | 2 | 0.10 | 289 | 588 |

TABLE 6-continued

Polymerization PCAT-3 with and without hydrogenation procatalyst CP$_2$TiCl$_2$-MMAO-3A

| Example # | PCAT-3 Loading (μmol) | Polymn Temp (° C.) | 1-Octene (g) | H$_2$ (mmol) | Cp$_2$TiCl$_2$-MMAO-3A | Eff (10$^6$ g/gM) | Mw (×10$^3$) | Δ(Mw) (%) |
|---|---|---|---|---|---|---|---|---|
| IE15 | 2.5 | 190 | 100 | 160 | 4 | 0.05 | 263 | 526 |
| IE16 | 3.15 | 190 | 100 | 160 | 8 | 0.04 | 256 | 509 |

When hydrogen was added to the reaction, the catalyst systems IE13, IE14, IE15, and IE16 that included the hydrogenating catalyst (Cp$_2$TiCl$_2$-MMAO-3A or Cp$_2$TiCl$_2$-Al($^i$Bu)$_3$) and the non-hydrogen-generating post-metallocene procatalyst (PCAT-3) produced polymers with a greater molecular weights than those of the polymers produced by the catalyst systems lacking the hydrogenating catalyst, such as CE18.

amount. This observation further confirms that the post-metallocene procatalyst PCAT-4 does not generate an amount of H$_2$ sufficient to significantly reduce the molecular weight of the polymer.

All references described within the Test Method and the Example section are incorporated by reference in their entirety.

TABLE 7

Polymerization PCAT-4 with and without hydrogenation procatalyst Cp$_2$TiCl$_2$—Al($^i$Bu)$_3$

| Example # | PCAT-4 Loading (μmol) | Polymn Temp (° C.) | 1-Octene (g) | H$_2$ (mmol) | Cp$_2$TiCl$_2$—Al($^i$Bu)$_3$ | Eff (10$^6$ g/gM) | Mw (×10$^3$) | SCB/1000TC | Δ(Mw) (%) |
|---|---|---|---|---|---|---|---|---|---|
| CE19 | 0.60 | 170 | 100 | 160 | 0 | 0.71 | 32 | 7.5 | 0 |
| IE17 | 2.00 | 170 | 100 | 160 | 2 | 0.23 | 227 | 4.6 | 600 |
| IE18 | 2.00 | 170 | 100 | 160 | 8 | 0.26 | 225 | 6.0 | 594 |
| CE20 | 7.50 | 170 | 100 | 0 | 8 | 0.03 | 278 | 10.8 | |
| CE21 | 0.50 | 170 | 100 | 0 | 0 | 0.79 | 310 | 7.5 | |

In Examples IE17 and IE18, the catalyst systems included the hydrogenating catalyst (Cp$_2$TiCl$_2$-MMAO-3A) and the non-hydrogen-generating post-metallocene procatalyst (PCAT-4). When hydrogen was added to the reaction, the catalysts systems of Examples IE17 and IE18 the produced polymers with a greater molecular weight when compared to the polymers produced by the catalyst systems lacking the hydrogenating catalyst, such as CE19.

To obtain the results in Table 8, the polymerization temperatures and the comonomer amount were varied, and polymerization reactions were performed without added hydrogen.

TABLE 8

Polymerization PCAT-4 with and without hydrogenation procatalyst Cp$_2$TiCl$_2$—Al($^i$Bu)$_3$ without added H$_2$

| Example # | PCAT-4 Loading (μmol) | Polymn Temp (° C.) | 1-Octene (g) | H$_2$ (mmol) | Cp$_2$TiCl$_2$—Al($^i$Bu)$_3$ | Eff (10$^6$ g/gM) | Mw (×10$^3$) | SCB/1000TC |
|---|---|---|---|---|---|---|---|---|
| CE22 | 2.50 | 170 | 250 | 0 | 0 | 0.10 | 406 | 7.6 |
| CE23 | 5.00 | 170 | 250 | 0 | 4 | 0.07 | 292 | 6.6 |
| CE24 | 7.50 | 170 | 250 | 0 | 8 | 0.06 | 255 | 7.5 |
| CE25 | 2.50 | 150 | 250 | 0 | 0 | 1.55 | 338 | 16.9 |
| CE26 | 5.00 | 150 | 250 | 0 | 4 | 0.08 | 261 | 16.0 |
| CE27 | 7.50 | 150 | 250 | 0 | 8 | 0.06 | 231 | 15.8 |

When the polymerization reactions were performed without added hydrogen, the molecular weights of the polymers produced by catalyst systems that included the hydrogenation procatalyst and the post-metallocene procatalyst, for example PCAT-4, were less than those of the polymers produced by the catalyst system lacking the hydrogenation procatalyst, regardless of the temperature and comonomer

The invention claimed is:

1. A catalyst system comprising:

a non-hydrogen-generating post-metallocene procatalyst;

a co-catalyst; and a hydrogenation procatalyst having the formula Cp$_2$TiX$_2$TiCp$_2$ or Cp$_2$TiX$_n$, where:

each Cp is cyclopentadienyl optionally substituted with at least one (C$_1$-C$_{10}$) alkyl;

each X is independently (C$_1$-C$_{40}$)hydrocarbon, (C$_1$-C$_{40}$)heterohydrocarbon, (C$_1$-C$_{40}$)hydrocarbyl, (C$_1$-C$_{40}$)heterohydrocarbyl, or a halide; and n is 1 or 2;

wherein the non-hydrogen-generating post-metallocene procatalyst is a metal-ligand complex according to formula (I):

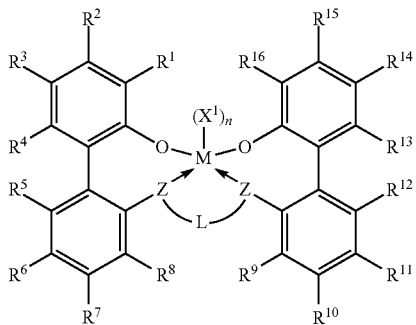

(I)

where:
- M is a metal selected from titanium, zirconium, or hafnium, the metal being in a formal oxidation state of +2, +3, or +4;
- n is 0, 1, or 2;
- when n is 1, $X^1$ is a monodentate ligand or a bidentate ligand;
- when n is 2, each $X^1$ is independently a monodentate ligand;
- each $X^1$ that is a monodentate ligand is independently halide, unsubstituted $(C_1\text{-}C_{20})$hydrocarbyl, unsubstituted $(C_1\text{-}C_{20})$hydrocarbyl, C(O)O—, or $R^K R^L N$—, where each of $R^K$ and $R^L$ is independently an unsubstituted $(C_1\text{-}C_{20})$hydrocarbyl;
- L is a diradical selected from the group consisting of $(C_1\text{-}C_{40})$hydrocarbylene, $(C_1\text{-}C_{40})$heterohydrocarbylene, —Si($R^C$)$_2$-, —Si($R^C$)$_2$OSi($R^C$)$_2$-, —Si($R^C$)$_2$C($R^C$)$_2$-, —Si($R^C$)$_2$Si($R^C$)$_2$-, —Si($R^C$)$_2$C($R^C$)$_2$Si($R^C$)$_2$-, —C($R^C$)$_2$Si($R^C$)$_2$C($R^C$)$_2$-, —N($R^N$)C($R^C$)$_2$-, —N($R^N$)N($R^N$)-, and —C($R^C$)$_2$N($R^N$)C($R^C$)$_2$-,
- each Z is independently selected from —O—, —S—, —N($R^N$)-, or —P ($R^P$)-;
- $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ are independently selected from the group consisting of —H, $(C_1\text{-}C_{40})$hydrocarbyl, $(C_1\text{-}C_{40})$heterohydrocarbyl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, $R^C$S(O)$_2$—, —N=C($R^C$)$_2$, $R^C$C(O)O—, $R^C$OC(O)—, $R^C$C(O)N(R)—, ($R^C$)$_2$NC(O)—, halide, radicals having formula (XI), radicals having formula (XII), and radicals having formula (XIII):

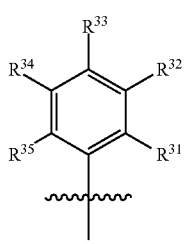

(XI)

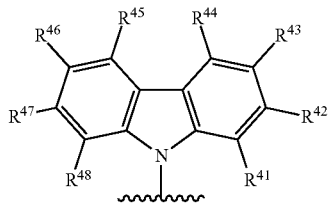

(XII)

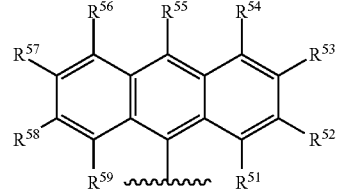

(XIII)

where:
- each of $R^{31}$-$R^{35}$, $R^{41}$-$R^{48}$, and $R^{51}$-$R^{59}$ is independently selected from —H, $(C_1\text{-}C_{40})$hydrocarbyl, $(C_1\text{-}C_{40})$heterohydrocarbyl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)-, ($R^C$)$_2$NC(O)—, or halide; and
- wherein the non-hydrogen-generating post-metallocene procatalyst is unsupported and the hydrogenation procatalyst is unsupported.

2. A catalyst system comprising:
- a non-hydrogen-generating post-metallocene procatalyst; and
- Cp$_2$TiX$_2$ treated with an aluminum alkyl species, where:
  - each Cp is cyclopentadienyl substituted with at least one $(C_1\text{-}C_{10})$ alkyl;
  - each X is independently $(C_1\text{-}C_{40})$hydrocarbon, $(C_1\text{-}C_{40})$heterohydrocarbon, $(C_1\text{-}C_{40})$hydrocarbon anion, $(C_1\text{-}C_{40})$heterohydrocarbon anion, or a halide;
- wherein the non-hydrogen-generating post-metallocene procatalyst is a metal-ligand complex according to formula (I):

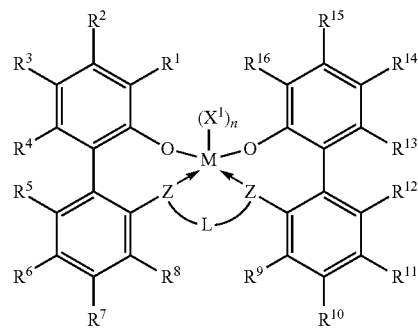

(I)

where:
- M is a metal selected from titanium, zirconium, or hafnium, the metal being in a formal oxidation state of +2, +3, or +4;
- n is 0, 1, or 2;
- when n is 1, $X^1$ is a monodentate ligand or a bidentate ligand;
- when n is 2, each $X^1$ is independently a monodentate ligand;
- each $X^1$ that is a monodentate ligand is independently halide, unsubstituted $(C_1\text{-}C_{20})$hydrocarbyl, unsubstituted $(C_1\text{-}C_{20})$hydrocarbyl, C(O)O—, or $R^K R^L N$—, where each of $R^K$ and $R^L$ is independently an unsubstituted $(C_1\text{-}C_{20})$hydrocarbyl;
- L is a diradical selected from the group consisting of $(C_1\text{-}C_{40})$hydrocarbylene, $(C_1\text{-}C_{40})$heterohydrocarbylene, —Si($R^C$)$_2$-, —Si($R^C$)$_2$OSi($R^C$)$_2$-, —Si($R^C$)$_2$C $(R^C)_2$-, —Si$(R^C)_2$Si$(R^C)_2$-, —Si$(R^C)_2$C$(R^C)_2$Si$(R^C)_2$-, —C$(R^C)_2$Si$(R^C)_2$C$(R^C)_2$-, —N$(R^N)$C$(R^C)_2$-, —N$(R^N)$N$(R^N)$-, and —C$(R^C)_2$N$(R^N)$C$(R^C)_2$-;

each Z is independently selected from —O—, —S—, —N$(R^N)$-, or —P $(R^P)$-;

$R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ are independently selected from the group consisting of —H, $(C_1$-$C_{40})$hydrocarbyl, $(C_1$-$C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, —N=C$(R^C)_2$, R$^C$C(O)O—, R$^C$OC(O)—, R$^C$C(O)N(R)—, $(R^C)_2$NC(O)—, halide, radicals having formula (XI), radicals having formula (XII), and radicals having formula (XIII):

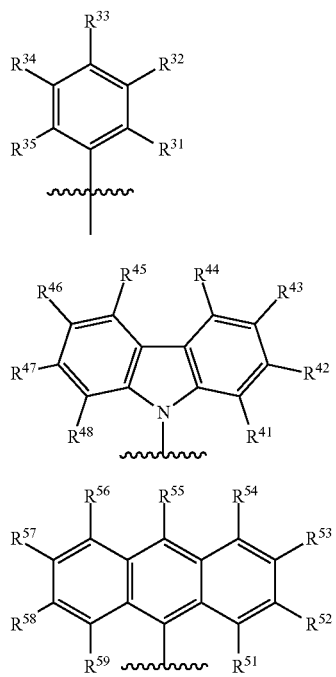

(XI)

(XII)

(XIII)

where:
each of $R^{31}$-$R^{35}$, $R^{41}$-$R^{48}$, and $R^{51}$-$R^{59}$ is independently selected from —H, $(C_1$-$C_{40})$hydrocarbyl, $(C_1$-$C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N$(R^N)$-, $(R^C)_2$NC(O)—, or halide; and wherein the non-hydrogen-generating post-metallocene procatalyst is unsupported and the Cp$_2$TiX$_2$ treated with an aluminum alkyl species is unsupported.

3. The catalyst system of claim 2, wherein the aluminum alkyl species comprises alkylaluminoxane, modified alkylaluminoxane, or an aluminum alkyl having the formula AlR$_3$ wherein each R is independently $(C_1$-$C_{40})$hydrocarbon $(C_1$-$C_{40})$heterohydrocarbon, $(C_1$-$C_{40})$hydrocarbyl, $(C_1$-$C_{40})$heterohydrocarbyl, or a halide.

4. The catalyst system of claim 2, wherein the aluminum alkyl species is the reaction product of AlR$_3$ and water, alcohol, silanol, or a Lewis base.

5. The catalyst system of claim 4, wherein the Lewis base is pyridine or mono-substituted alkylamine, disubstituted alkylamine, or tri-substituted alkylamine.

6. The catalyst system of claim 2, wherein the aluminum alkyl species is diisobutylaluminum oxide (DIBAO or DIBAL-O) or Isobutylaluminoxane (IBAO).

7. The catalyst system of claim 1, wherein the catalyst system further comprises an impurity scavenger.

8. The catalyst system of claim 1, wherein each X is a substituted benzyl or substituted heteroarylbenzyl.

9. The catalyst system of claim 1, wherein X is selected from the group consisting of:

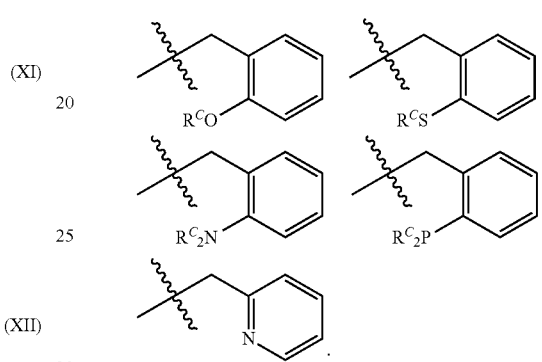

10. The catalyst system of claim 1, wherein the non-hydrogen-generating post-metallocene procatalyst produces less than or equal to 1 ppm of hydrogen under polymerization conditions.

11. The catalyst system of claim 2, wherein the catalyst system further comprises an impurity scavenger.

12. The catalyst system of claim 2, wherein each X is a substituted benzyl or substituted heteroarylbenzyl.

13. The catalyst system of claim 2, wherein X is selected from the group consisting of:

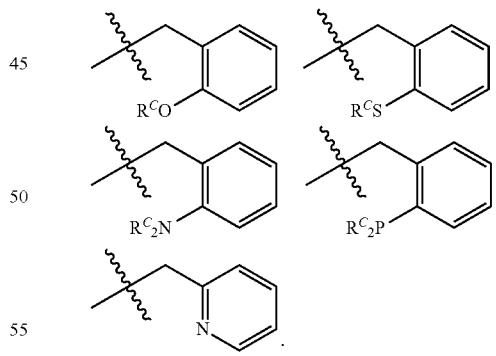

14. The catalyst system of claim 2, wherein the non-hydrogen-generating post-metallocene procatalyst produces less than or equal to 1 ppm of hydrogen under polymerization conditions.

* * * * *